Patented Nov. 27, 1928.

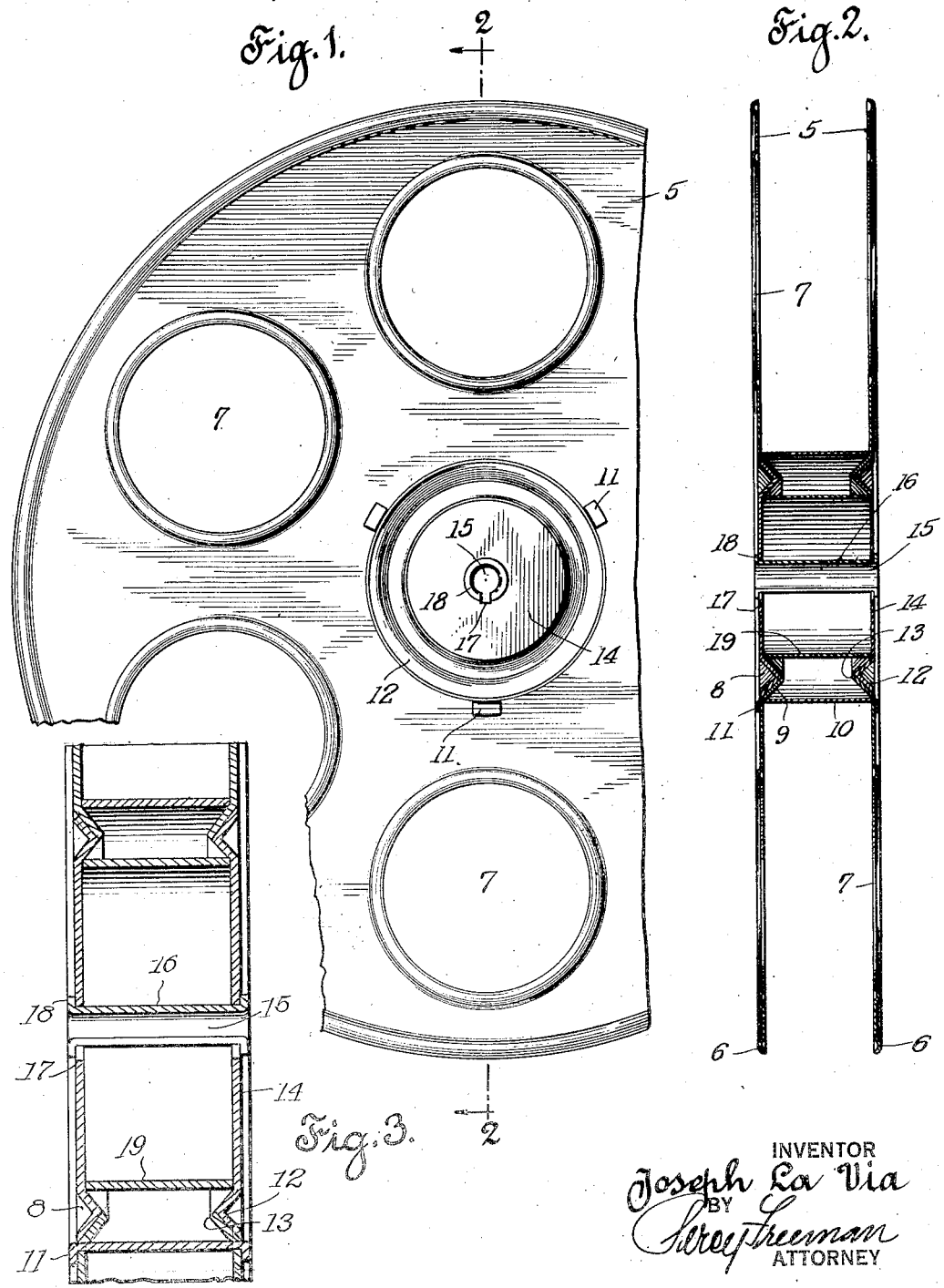

1,692,846

UNITED STATES PATENT OFFICE.

JOSEPH LA VIA, OF LONG ISLAND CITY, NEW YORK.

FILM REEL.

Application filed February 1, 1927. Serial No. 165,075.

This invention relates to reels with particular reference to such winding devices as are used with motion picture films.

In winding and rewinding films, from one reel to another, it is customary to drive the receiving or take-up reel while the feeding reel is free to rotate, the take-up reel being driven at a greater speed than the take-up sprockets. It is well known in winding film, on the take-up reel, during the operation of a projection machine, the film is subjected to great strain due to the fact that the film is threaded through the machine from the upper or feeding reel, over the driving sprockets, the teeth of which engage in the film perforations, to the take-up or lower reel, which is driven to take up the film fed to it by the take-up sprocket. The film is pulled very taut by the take-up reel against the slower speed of the lower or take-up sprocket. This causes the film to jump the take-up sprocket teeth when a patch is passing over it and causes elongation of the perforations.

An attempt has been made to offset this "pull" by interposing a friction disc between the take-up reel and the transmission, which is still highly unsatisfactory though up to applicant's invention it has been the best method devised.

The defect however, resides in the fact that the coil spring maintaining contact between the faces of the friction discs must be made strong enough to insure the driving the take-up reel when the full weight of 2000 or more feet of film is on it and the spring tension is constant.

Applicant seeks to avoid the difficulties and therefore one of the prime objects is to provide means by which the friction between the driving shaft and the take-up reel is automatically and naturally increased as the weight of film on the reel increases.

Another object of this invention is to provide a film reel having means incorporated therein to prevent ripping of the film due to sudden tautering of the same when the machine is started.

A further object is in the provision of a reel having the driving portion thereof keyed to the take-up spindle of a motion picture machine and the film carrying portion frictionally engageable therewith.

These and other objects are accomplished by the novel construction, combination and arrangement of parts hereinafter described and illustrated in the accompanying drawing, forming a material part of this disclosure, and in which:—

It is therefore a feature of the present invention to produce a film reel in which the central or hub portion may be driven at a uniform rate of speed and transmit its rotation frictionally to the outer or main portion.

Figure 1 is a partial side elevational view of a film reel made in accordance with the invention.

Figure 2 is a transverse sectional view taken on line 2—2 of Figure 1.

Figure 3 is an enlarged view of the central part of Figure 2.

In the drawing, the numeral 5 designates a pair of similar circular plates having a beading 6 around the outer periphery thereof, the plates being provided with a plurality of radial beaded openings 7 to lighten weight and a central opening 8 the surrounding walls of which are bent toward each other as at 9.

Intermediate the plates 5 is a tube 10 having lugs 11 piercing the plates and bent over holding the same together.

Frictionally engaging the conical walls 9 are the outer wings 12 of V-shaped elements 13 formed on a pair of small discs 14, the discs being provided with a central opening 15 in which is fixed a tube 16, having a narrow slot or keyway the outer ends 8, of which are flanged over to engage the outer surface of the discs 14 adjacent the opening 15.

The discs 14 are prevented from moving towards each other by a band 19 engaging the inner surfaces of the discs at the meeting point of the discs and their V-shaped angular portions 13.

Thus, in operation, a keyed spindle engages the slotted tube 16, the band 10 forming a drum carrying the film roll.

It will now be understood that while the discs 14 are driven positively by the machine, the band 10 carried by the plates 5 is rotated by the frictional contacting of the inbent elements 9 with the wings 12 so that, should the film suddenly become jammed, the band or tube 10 would stop revolving but the inner discs 14 would continue to rotate. Likewise while the first several hundred feet of film were being taken up, an extra pull would be offset by slippage between the drum portion and the hub portion.

From the foregoing it may be seen that a film reel has been disclosed having means whereby the film carrying portion of the reel is rotated by frictional engagement only, with a central portion positively driven by a spindle thereby preventing a sudden stop from injuring the film by ripping or creasing, and preventing elongation of the perforations or jumping of the sprockets.

It is obvious that applicant's reel may be applied directly on a positively driven take-up shaft thus eliminating friction discs, springs etc.

As changes of construction could be made within the scope of the invention, it is intended that all matter contained in the foregoing description or shown in the accompanying drawing shall be interpreted as illustrative and not in a limiting sense.

Having thus described my invention, what I claim as new and desire to secure by Letters Patent is:—

1. A film reel comprising a pair of circular plates, means connecting said plates in parallel spaced relation, said plates having central registering openings the surrounding walls of which are inbent, a slotted bushing, a pair of discs in spaced relation on said bushing and means formed on the periphery of said discs adapted to confine and frictionally engage said inbent walls.

2. A film reel comprising a pair of circular plates, a tube intermediate said plates, lugs on said tube engaging said plates, converging central flanges on said plates, a slotted bushing, a pair of discs on said bushing in opposed relation and V shaped elements formed on the outer periphery of said discs, the outer walls of said V shaped elements confining and frictionally engaging said central flanges of the plates.

3. A film reel comprising a drum portion and a core portion frictionally engaged therewith and arranged to revolve with respect to each other under certain conditions, the drum portion comprising a pair of circular plates, a tube intermediate said plates, lugs on said tube engaging said plates, and converging circular flanges on said plates, and flanges on the hub portion for frictional engagement with the plate flanges.

4. A film reel comprising a drum portion and a core portion frictionally engaged therewith and arranged to revolve with respect to each other under certain conditions, the drum portion comprising a pair of circular plates, a tube intermediate said plates, lugs on said tube engaging said plates, and converging circular flanges on said plates, the hub portion comprising a slotted bushing, a pair of discs in opposed relation on said bushing and a bevelled annulus on each disc complementary to and adapted to frictionally engage the converging walls of the plates.

5. A reel comprising a hub portion and a drum portion, the drum portion frictionally engaged therewith consisting of a pair of opposed circular plates having central openings, inreaching conical flanges extending from said plates into the openings, a tube fitted between said plates at the junction of said flanges with the plates, and lugs on the ends of said tube, extending through apertures in said plates, and bent to extend thereover.

6. A reel comprising a hub portion and a drum portion, the drum portion consisting of a pair of opposed circular plates having central openings, inreaching conical flanges extending from said plates into the openings, a tube fitted between said plates at the junction of said flanges with the plates, lugs on the ends of said tube extending through apertures in said plates, and bent to extend thereover; said hub portion comprising a pair of discs having outwardly extending lateral flanges complementary to the plate flanges and in frictional surface contact therewith, and a key-wayed tube fixed axially betwen said discs to retain them in spaced relation and to serve as the axis of the reel.

7. A reel comprising a pair of circular plates having central openings, inreaching conical flanges extending from said plates into the openings, a tube fitted between said plates at the junction of said flanges with the plates, lugs on the ends of said tube extending through apertures in said plates to be upset thereover, a hub composed of a pair of discs, a tubular spacer therebetween, a central tube extending through said discs and upset thereover, said tube acting as the axis of a reel, and inreaching flanges on the outer edges of said discs complementary to the plate flanges and adapted to frictionally engage the flanges of said plates.

Signed at New York, in the county of New York and State of New York, this 28th day of December, 1926.

JOSEPH LA VIA.